United States Patent [19]
Kafai

[11] Patent Number: 6,116,107
[45] Date of Patent: Sep. 12, 2000

[54] LEAD SCREW PIEZO NUT POSITIONING DEVICE AND PIEZO NUT POSITIONER ASSEMBLY THEREOF

[76] Inventor: Bahram Berj Kafai, 10315 Woodley Ave., Ste. 114, Granada Hills, Calif. 91344-6900

[21] Appl. No.: 09/335,854

[22] Filed: Jun. 17, 1999

Related U.S. Application Data

[60] Provisional application No. 60/090,699, Jun. 24, 1998.

[51] Int. Cl.[7] .................................................. F16H 25/24
[52] U.S. Cl. ........................................ 74/424.8 R; 74/441
[58] Field of Search ........................... 74/89.15, 424.8 R, 74/441, 459

[56] References Cited

U.S. PATENT DOCUMENTS

| | | | |
|---|---|---|---|
| 3,831,460 | 8/1974 | Linley, Jr. | 74/459 |
| 3,977,269 | 8/1976 | Linley, Jr. | 74/441 |
| 4,434,677 | 3/1984 | Linley, Jr. | 74/409 |
| 4,487,087 | 12/1984 | Joanstone | 74/424.8 A |
| 4,639,630 | 1/1987 | Rodloff et al. | 310/328 |
| 5,282,393 | 2/1994 | Arnone et al. | 74/479 PF |
| 5,400,674 | 3/1995 | Arnone et al. | 74/490.13 |
| 5,425,616 | 6/1995 | Arai et al. | 414/680 |
| 5,604,413 | 2/1997 | Khorrami et al. | 318/632 |
| 5,676,019 | 10/1997 | Shenk et al | 74/414.8 A |
| 5,742,145 | 4/1998 | Khorrami et al. | 318/632 |
| 5,771,749 | 6/1998 | Yoneyama | 74/490.12 |
| 5,862,707 | 1/1999 | Metsala | 74/441 |

OTHER PUBLICATIONS

"Motorized Components" New Focus, Inc. pp. 164–169.
"Basic Introduction to Nano Positioning with Piezo Electric Technology", Physik Instruments, 9 pages.

*Primary Examiner*—Dirk Wright
*Attorney, Agent, or Firm*—Flanagan & Flanagan; John R. Flanagan; John K. Flanagan

[57] ABSTRACT

A lead screw piezo nut positioning device includes coupling and driven members and a piezo nut positioner assembly. The coupling member is secured to an external machine part and received about a lead screw such that the lead screw does not directly drivingly engage and cause movement of the coupling member nor of the external machine part. The driven member is threadably coupled about the lead screw for undergoing coarse movement along the lead screw in response to its rotation. The piezo nut positioner assembly is disposed between the coupling and driven members and received over the lead screw such that the assembly is not directly drivingly engaged nor moved by the lead screw. The assembly is electrically activatable to undergo axial expansion along the lead screw and extends between and interconnects the coupling and driven members such that the position of the external machine part secured to the coupling member can be coarsely adjusted relative to the lead screw via the assembly and coupling member and finely adjusted relative to the lead screw via the coupling member after the rotation of the lead screw and thus the coarse movement of the driven member have ceased. The axial expansion of the piezo nut positioner assembly is proportional to the frequency of an electrical voltage applied to the assembly.

20 Claims, 3 Drawing Sheets

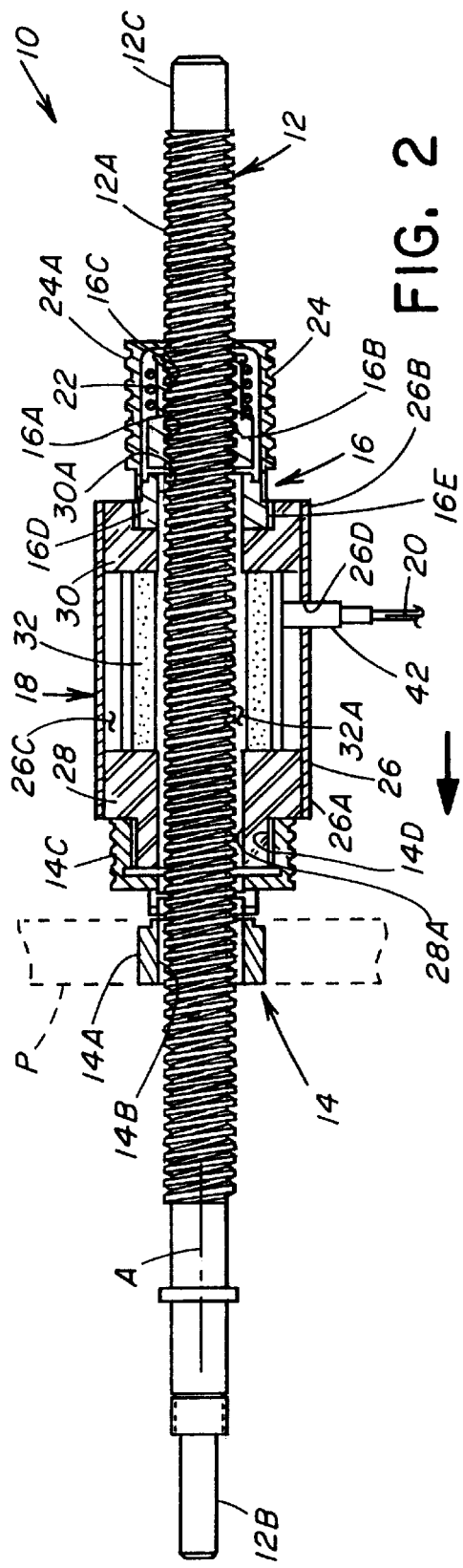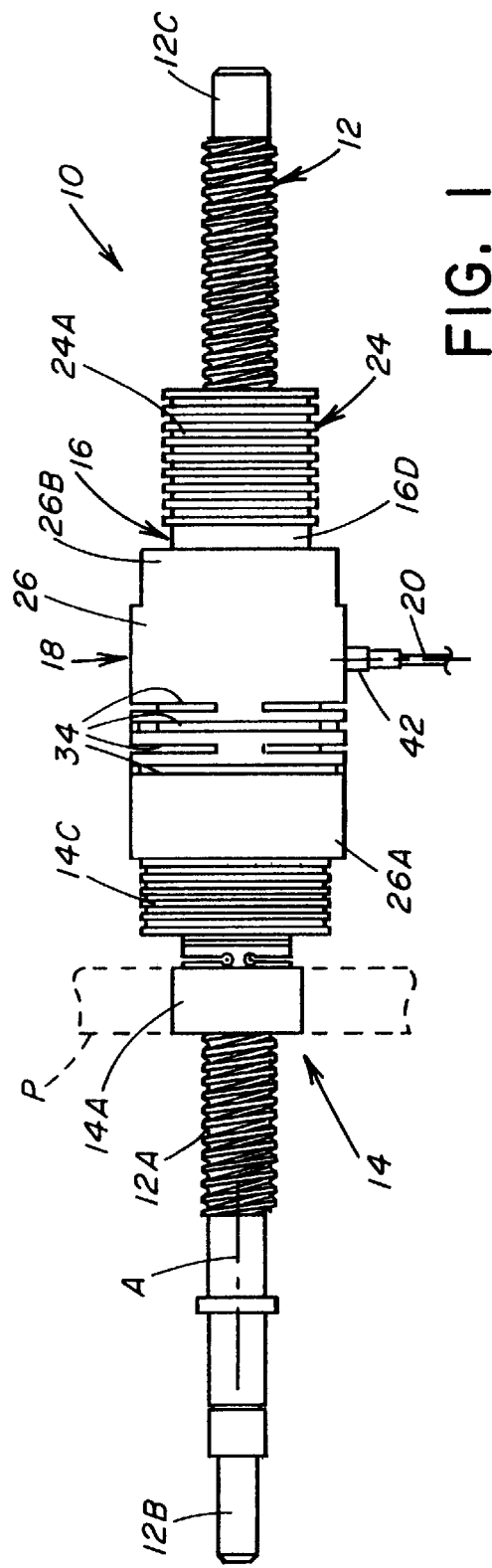

LEAD SCREW PIEZO NUT POSITIONING DEVICE AND PIEZO NUT POSITIONER ASSEMBLY THEREOF

This patent application claims the benefit of U.S. provisional application No. 60/090,699, filed Jun. 24, 1998.

BACKGROUND OF THE INVENTION

1. Field of the Invention

The present invention generally relates to systems for adjusting the relative positions of machine and tool parts using lead screw drive mechanisms and, more particularly, is concerned with a lead screw piezo nut positioning device and a piezo nut positioner assembly thereof.

2. Description of the Prior Art

Lead screws and nuts are often used in drive mechanisms to adjust the relative positions of machine and tool parts. The lead screw provides robust but coarse adjustment of the relative positions of the parts. The nut is mount to the movable part and threadably driven by the lead screw. A problem exists, however, with such drive mechanisms in that a clearance space is created between the respective threads of the lead screw and driven nut which results in a degree of looseness therebetween that gives rise to an undesired backlash of the driven nut relative to the screw and thereby an unacceptable degree of imprecision in positioning the movable part.

Anti-backlash nuts and the like have been developed over the years to resolve this problem associated with such drive mechanisms. Representative examples of anti-backlash nuts are disclosed in U.S. Pat. Nos. 3,831,460; 3,977,269 and 4,434,677 to Linley, Jr. Each of the anti-backlash nuts of the Linley, Jr. patents discloses a nut construction which has internal threads thereon brought into close engagement with the lead screw threads to eliminate looseness and minimize clearance space between the driven nut and lead screw threads. While anti-backlash nuts like those of the Linley, Jr. patents appear to provide a satisfactory solution for backlash, they do not provide sufficiently fine or micro adjustment and positioning of movable machine and tool parts using lead screws in certain instances.

Certain precision equipment, such as computer disk drives, semiconductor tools and nanometer scales, require high-resolution positioning stages. Piezo actuators and flexure stages have been used for fine movements on top of existing linear crossed-roller or air-bearing stages. Use of second stages, however, limits the full travel of the existing stage, involves additional parts which add weight to and reduces surface area of the existing stage, adds height to the existing stage, and increases cost of the existing stage.

Consequently, a need remains for an innovation which provides a more effective solution for fine adjustment of precision equipment without introducing any new problems in place thereof.

SUMMARY OF THE INVENTION

The present invention provides a lead screw piezo nut positioning device designed to satisfy the aforementioned need. The lead screw piezo nut positioning device of the present invention, for sake of brevity hereinafter referred to as the "positioning device", is compact and cost-effective, achieves coarse and submicron fine positioning over the full travel range of the existing stage, and has minimal impact on cost, weight, surface area and height of the existing stage. The positioning device produces an initial coarse movement of a movable machine part via a conventional lead screw rotatably driven by a conventional motor. Then, after driving by the motor is stopped and rotation of the lead screw terminated, a piezo nut positioner assembly of the positioning device functions to produce a desired final fine movement of the movable machine part with a submicron resolution. The piezo nut positioner assembly of the positioning device when electrically actuated is axially expanded within a submicron travel range relative to and along the lead screw in the direction of the movable machine part by a desired amount proportional to the frequency of a controlled electrical voltage applied to the piezo nut positioner assembly and is thereby adjusted to any desired position throughout the full travel range of the lead screw and submicron travel range for the desired coarse and fine positioning of the movable part.

Accordingly, the present invention is directed to a lead screw piezo nut positioning device which comprises: (a) a coupling member adapted for securement to an external machine part and having a longitudinal bore for receiving a lead screw therethrough such that the lead screw does not directly drivingly engage and cause movement of the coupling member nor of the external machine part which is movable in a direction along a longitudinal rotational axis of the lead screw; (b) a driven member threadably coupled to and disposed about the lead screw for undergoing coarse movement along the lead screw in response to rotation of the lead screw; and (c) a piezo nut positioner assembly disposed between the coupling and driven members and having a longitudinal passage for receiving the lead screw therethrough such that the assembly is not directly drivingly engaged nor moved by the lead screw, the assembly being electrically activatable to undergo axial expansion along the lead screw, the assembly extending between and interconnecting the coupling and driven members such that the position of the external machine part secured to the coupling member can be coarsely adjusted relative to the lead screw via the assembly and coupling member undergoing the coarse movement with the driven member along the lead screw in response to rotation of the lead screw and can be finely adjusted relative to the lead screw via the coupling member undergoing fine movement corresponding to the axial expansion of the assembly along the lead screw when the rotation of the lead screw and thus the coarse movement of the driven member have ceased. The axial expansion of the piezo nut positioner assembly is proportional to the frequency of an electrical voltage applied to the assembly. The longitudinal bore of the coupling member and the longitudinal passage of the piezo nut positioner assembly are threadless.

The positioning device also comprises a coil spring mounted to and disposed circumferentially about the driven member for preloading the same and a cover mounted to the assembly and disposed substantially around the driven member. The piezo nut positioner assembly includes a tubular casing having a pair of opposite end portions. The coupling member is mounted to one of the opposite end portions of the casing and the driven member is mounted to the other of the opposite end portions of the casing such that the casing interconnects the coupling and driven members together and the position of the external machine part secured to the coupling member is finely adjustable relative to the lead screw by the axial expansion of the assembly along the lead screw without corresponding rotation of the lead screw.

Also, the tubular casing has an initial contracted condition from which the casing axially elongates upon activation and axial expansion of the piezo nut positioner assembly. The casing also has a plurality of spaced apart substantially circumferential slots formed therein to provide the casing with a spring back bias causing the casing to return to the initial contracted condition upon deactivation and axial contraction of the piezo nut positioner assembly.

The present invention is also directed to the piezo nut positioner assembly which comprises: (a) a tubular casing having a pair of opposite ends and a central cavity extending between the opposite ends; (b) a pair of end fittings each connected to one of the opposite ends of the tubular casing and having an opening defined in communication with the central cavity; and (c) a piezoelectric body disposed within the central cavity of the tubular casing between the end fittings and having a longitudinal passage defined in communication with the openings of the end fittings. The openings of the end fittings and the longitudinal passage of the piezoelectric body receive the lead screw therethrough such that the end fittings and piezoelectric body are not directly drivingly engaged by the lead screw. The assembly is electrically activatable in response to an electrical signal applied to the piezoelectric body so as to undergo axial expansion along a longitudinal rotational axis of the lead screw and produce a fine adjustment.

More particularly, the piezoelectric body includes a plurality of piezo ceramic disks and a plurality of metallic electrodes. The piezo ceramic disks are mounted to one another and together define the longitudinal passage receiving the lead screw therethrough such that the piezo ceramic disks are not directly drivingly engaged with the lead screw. The metallic electrodes are mounted to the piezo ceramic disks in a predetermined arrangement and the piezo ceramic disks are axially expandable parallel to the lead screw in proportion to the frequency of an electrical voltage applied to the metallic electrodes. The piezo ceramic disks are mounted to one another in a stacked configuration. The metallic electrodes are disposed between and mounted to adjacent ones of the piezo ceramic disks such that the metallic electrodes and the piezo ceramic disks are disposed in an alternating arrangement.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a side elevational view of a lead screw piezo nut positioning device of the present invention.

FIG. 2 is a longitudinal sectional view of the positioning device of FIG. 1.

DETAILED DESCRIPTION OF THE INVENTION

Figure 3:
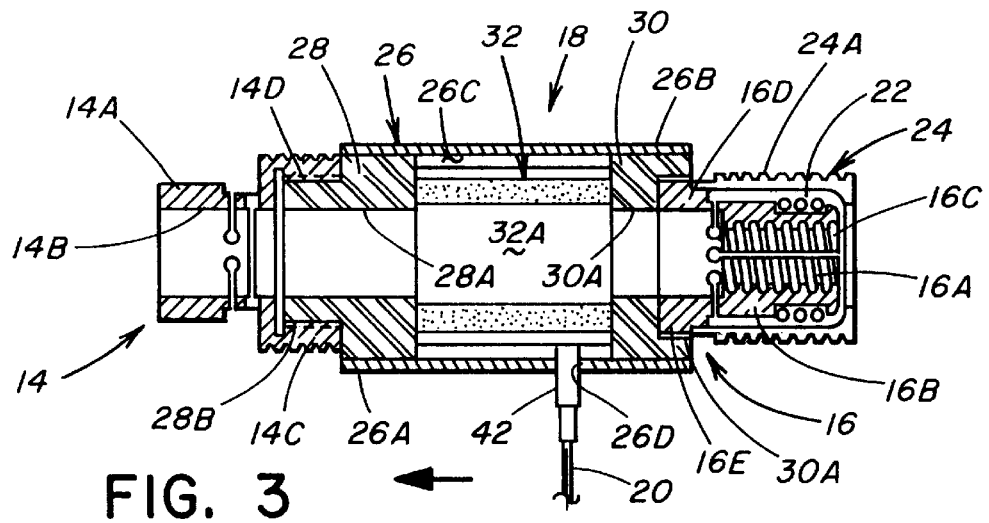
FIG. 3 is an assembled longitudinal sectional view of the positioning device without the lead screw.
Figure 4:
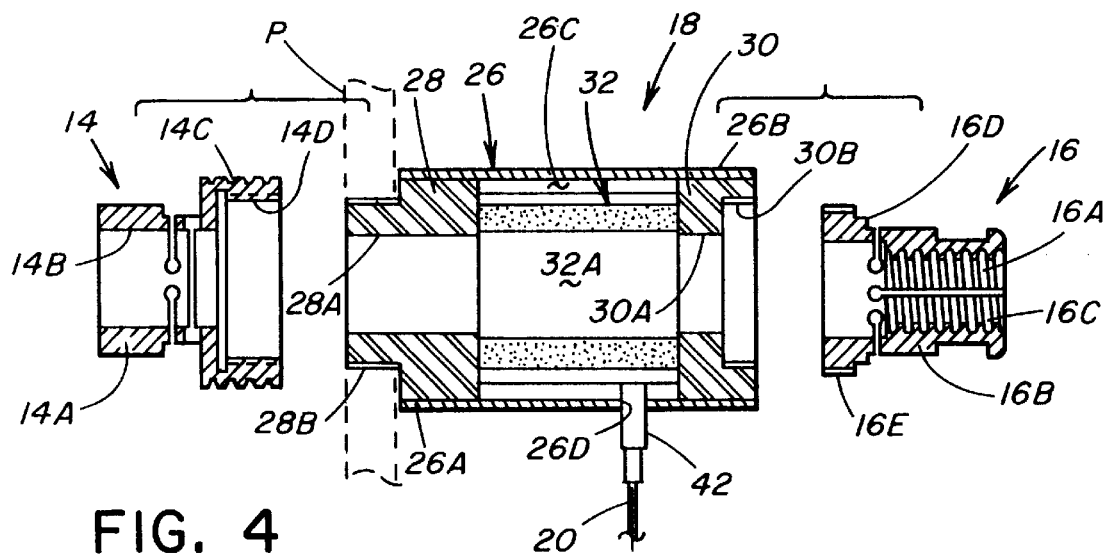
FIG. 4 is an exploded longitudinal sectional view of the positioning device without the lead screw.

Referring to the drawings and particularly to FIGS. 1 to 2, there is illustrated a lead screw piezo nut positioning device, generally designated 10, of the present invention, secured to a movable machine part P and drivingly mounted on an elongated conventional lead screw 12 having external drive threads 12A extending substantially between opposite end portions 12B, 12C of the lead screw 12. The lead screw 12 is rotatably supported in a known manner at its opposite end portions 12B, 12C and is adapted at its one end portion 12B for coupling to a source of rotary motion, such as a stepper or servo motor (not shown), for rotatably driving the lead screw 12 about a longitudinal rotational axis A of the lead screw 12 to produce the desired coarse movement of the machine part P relative to the lead screw 12.

Figure 6:
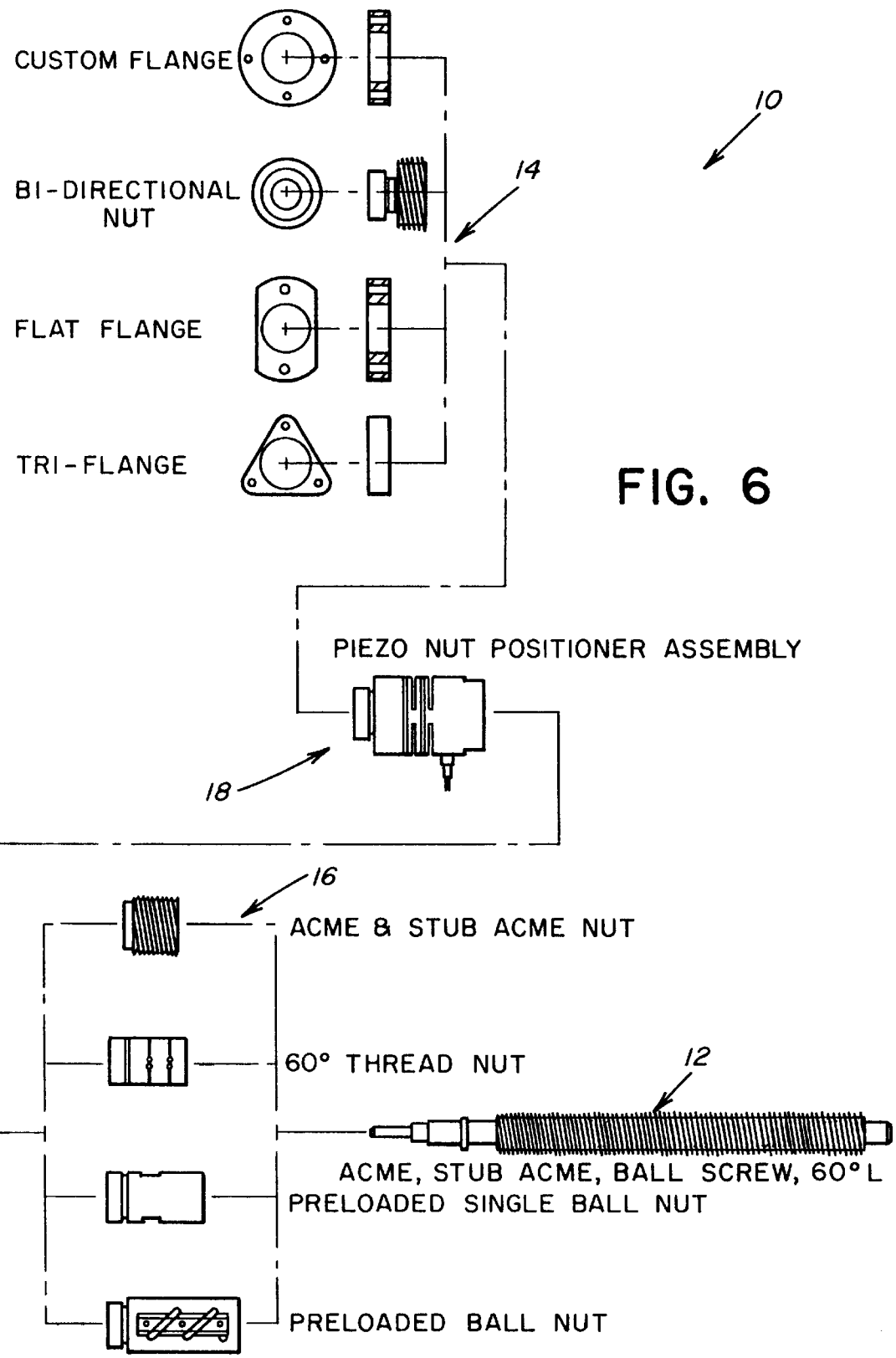
FIG. 6 is an exploded side elevational view of the positioning device having various possible combinations of machine part coupling members and lead screw driven members.

Referring to FIGS. 1 to 4, the positioning device 10 basically includes a machine part coupling member 14, a lead screw driven member 16, and a piezo nut positioner assembly 18, all of which are disposed about the elongated lead screw 12. The coupling member 14 and driven member 16 are per se conventional components and can each take many different forms, some examples of which are depicted in FIG. 6. The driven member 16 is internally threaded at 16A and disposed about and threadably coupled to the external drive threads 12A of the lead screw 12 for undergoing coarse movement along the lead screw 12 in response to its rotation. The coupling member 14 is secured in any suitable manner to the external machine part P and received about the lead screw 12 such that the lead screw 12 does not directly drivingly engage and cause movement of the coupling member 14 nor of the external machine part P. The piezo nut positioner assembly 18 is disposed between the coupling and driven members 14, 16 and received over the lead screw 12 such that the assembly 18 is not directly drivingly engaged nor moved by the lead screw 12. The assembly 18 is electrically activatable via wires 20 so as to undergo axial expansion along the lead screw 12. The assembly 18 extends between and interconnects the coupling and driven members 14, 16 such that the position of the external machine part P secured to the coupling member 14 can be coarsely adjusted relative to the lead screw 12 via the assembly 18 and coupling member 14, while the assembly 18 is deactivated, and finely adjusted relative to the lead screw 12 via the coupling member 14 after the rotation of the lead screw 12 and thus the coarse movement of the driven member 16 have ceased. The axial expansion of the assembly 18 is proportional to the frequency of an electrical voltage applied to the assembly 18 via the wires 20 leading from a suitable electrical control source (not shown).

As mentioned above, the coupling member 14 of the device 10 is secured by any suitable means to the machine part P. The machine part P can be a movable component of precision equipment, including but not limited to computer disk drives, semiconductor tools and nanometer scales, and other equipment. The coupling member 12 is generally annular shaped and may have any of several possible configurations, such as that of a bi-directional nut or a flange having any suitable shape, as shown in FIG. 6. One preferred embodiment of the coupling member 12 is a coupling nut, such as the bi-directional nut. At one end portion 14A thereof, the coupling member 14 has a longitudinal bore 14B with a diameter slightly greater than that of the lead screw 12 for receiving the lead screw 12 therethrough. The longitudinal bore 14B is threadless such that the lead screw 12 does not directly drivingly engage and cause movement of the coupling member 14 nor the external machine part P which is movable in a direction along and parallel to the longitudinal rotational axis A of the lead screw 12. At an opposite end portion 14C, the coupling member 14 has a recess with internal threads 14D used for connecting the coupling member 14 to one end of the positioner assembly 18.

The lead screw driven member 16 is generally annular shaped and may have any of several possible configurations, such as that of an acme and stub acme nut, a sixty degree thread nut, a preloaded single ball nut or a preloaded ball nut, as shown in FIG. 6. At one end portion 16B thereof, the driven member 16 has a longitudinal bore 16C with the internal threads 16A for threadably receiving therethrough and drivingly coupling with the external drive threads 12A of the lead screw 12 so that the driven member 16 can be moved along and parallel to the longitudinal axis A of the lead screw 12 but only with corresponding rotation of the lead screw 12. At an opposite end portion 16D, the driven member 16 has a threadless recess and external threads 16E used for connecting the driven member 16 to an opposite end of the positioner assembly 18.

The positioning device 10 also includes a coil spring 22 and may include a hollow cover 24. The coil spring 22 is mounted to and disposed circumferentially about the driven member 16 within an external annular recess 16F thereon so as to preload the driven member 16. The cover 24 has a substantially tubular cylindrical configuration with a substantially uniform diameter and snugly fits over the other end portion 16D of the driven member 16. The cover 24 has an exterior gripping surface 24A thereon in the form of alternating circumferential ridges and recesses.

Referring now to FIGS. 1 to 5, the piezo nut positioner assembly 18 also of the present invention basically includes a tubular casing 26, a pair of annular-shaped opposite end fittings 28, 30, and a piezoelectric body 32. The tubular casing 26 has a pair of opposite ends 26A, 26B and a central cavity 26C extending between the opposite ends 26A, 26B. Each of the end fittings 28, 30 is connected to one of the opposite ends 26A, 26B of the tubular casing 26 and has an opening 28A, 30A defined in communication with the central cavity 26C of the casing 26. The piezoelectric body 32 is disposed within the central cavity 26C of the tubular casing 26 between the end fittings 28, 30 and has a longitudinal passage 32A defined in communication with the openings 28A, 30A of the end fittings 28, 30. The longitudinal passage 32A is threadless so that the piezoelectric body 32 is not engaged with the lead screw 12 and so the piezoelectric body 32 may move parallel to the longitudinal rotational axis A of the lead screw 12 without corresponding rotation of the lead screw 12. The openings 28A, 30A of the end fittings 28, 30 and longitudinal passage 32A of the piezoelectric body 32 thus receive the lead screw 12 therethrough such that the end fittings 28, 30 and piezoelectric body 32 are not directly drivingly engaged by the lead screw 12. The piezoelectric body 32 is electrically activatable in response to an electrical signal applied thereto via the wires 20 so as to undergo axial expansion along a longitudinal rotational axis A of the lead screw 12 and produce a fine adjustment of the position of the coupling member 16 and machine part P attached thereto without rotation of the lead screw 12.

Further, the tubular casing 26 has at least one and, preferably, a plurality of slots 34 provided in substantially parallel relation to one another and part of the way around the circumference of the casing 26. The slots 34 are disposed adjacent to one another and in communication with the central cavity 26C of the casing 26. Due to the presence of the slots 34, the casing 26 has an initial contracted condition from which it axially elongates upon activation and axial expansion of the piezoelectric body 32. The presence of the slots 34 provide the casing 26 with an inherent spring back bias causing it to return to the initial contracted condition upon deactivation and axial contraction of the piezoelectric body 32. The casing 26 also defines a hole 26D therein through which passes the wires 20.

Figure 5:
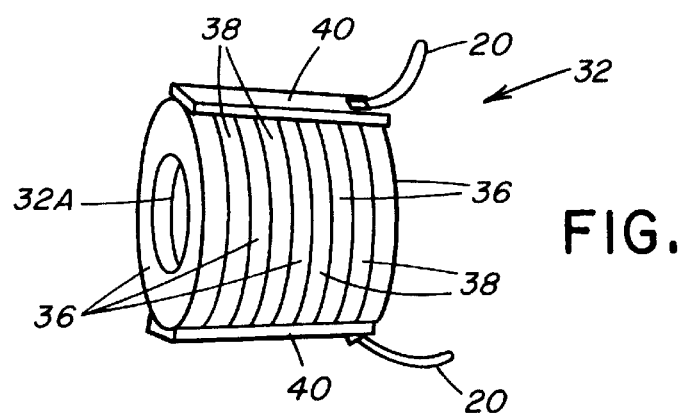
FIG. 5 is a detailed view of a piezoelectric body of piezo ceramic disks and metallic electrodes of a piezo nut positioner assembly of the positioning device.

As seen in FIG. 5, the piezoelectric body 32 includes a plurality of ceramic disks 36 and a plurality of metallic electrodes 38. The ceramic disks 36 are mounted to one another and all together define the longitudinal passage 32A of the piezoelectric body 32. The ceramic disks 36 are, preferably, mounted to one another in a stacked configuration and all together have a substantially tubular cylindrical configuration. The ceramic disks 36 are of any suitable number. The piezoelectric body 32 also includes at least one and, preferably, a pair of strips 40 of solder material. Each strip 40 has a substantially flat rectangular configuration. The pair of strips 40 are mounted to the stack of ceramic disks 36 along opposite sides thereof.

The metallic electrodes 38 are mounted to the ceramic disks 36 in a predetermined arrangement. The arrows indicate directions of axial expansion of the piezoelectric body 32 upon application of an electrical voltage. The electrical voltage which causes the piezoelectric body 32 to axially expand parallel to and along the lead screw 12 is applied to the metallic electrodes 38. The metallic electrodes 38 are, preferably, disposed between and mounted to adjacent ones of the ceramic disks 36 such that the metallic electrodes 38 and the ceramic disks 36 are disposed in an alternating arrangement. Each metallic electrode 38 has a substantially flat annular configuration conforming to the shape of one of the ceramic disks 36 or any other suitable configuration. The metallic electrodes 38 being of any suitable number are connected to the electrical wires 20 which are covered by a cable 42 and have opposite positive and negative potentials.

The coupling member 14 and driven member 16 are mounted to the end fittings 28, 30 at the respective opposite ends 26A, 26B of the casing 26. Particularly, the coupling member 14 has the internal threads 14D. The one end fitting 28 on the casing 26 has external threads 28B which are threadably mated with the internal threads 14D of the coupling member 14. The driven member 16 has the external threads 16E. The other end fitting 30 on the casing 26 has internal threads 30B which are threadably mated with the external threads 16E of the driven member 16.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A piezo nut positioner assembly for a lead screw piezo nut positioning device, said assembly comprising:

(a) a tubular casing having a pair of opposite ends and a central cavity extending between the opposite ends;

(b) a pair of end fittings each connected to one of said opposite ends of said tubular casing and having an opening defined in communication with said central cavity; and (c) a piezoelectric body disposed within said central cavity of said tubular casing between said end fittings and having a longitudinal passage defined in communication with said openings of said end fittings, said openings of said end fittings and said longitudinal passage of said piezoelectric body receiving a lead screw therethrough and being threadless such that said end fittings and piezoelectric body are not directly drivingly engaged by the lead screw, said assembly being electrically activatable in response to an electrical signal applied to said piezoelectric body to undergo axial expansion along a longitudinal rotational axis of the lead screw as to produce a fine adjustment corresponding to said axial expansion.

2. The assembly of claim 1 wherein said piezoelectric body includes:

a plurality of piezo ceramic disks mounted to one another and together defining said longitudinal passage receiving the lead screw therethrough such that said piezo ceramic disks are not directly drivingly engaged with the lead screw; and a plurality of metallic electrodes mounted to said piezo ceramic disks in a predetermined arrangement, said piezo ceramic disks being axially expandable along the longitudinal axis of the lead screw in proportion to the frequency of an electrical voltage applied to said metallic electrodes.

3. The assembly of claim 2 wherein said piezo ceramic disks are mounted to one another in a stacked configuration.

4. The assembly of claim 2 wherein said metallic electrodes are each disposed between and mounted to adjacent ones of said piezo ceramic disks such that said metallic electrodes and said piezo ceramic disks are disposed in an alternating arrangement.

5. The assembly of claim 1 wherein one of said end fittings has external threads for threadably mating with internal threads on a coupling member of a movable machine part.

6. The assembly of claim 5 wherein the other of said end fittings has internal threads for threadably mating with external threads on a driven member threadably mated with the lead screw.

7. The assembly of claim 1 wherein said tubular casing has an initial contracted condition from which said casing axially elongates upon activation and axial expansion of said piezoelectric body, said casing also having a plurality of spaced apart substantially circumferential slots formed therein providing said casing with a spring back bias causing said casing to return to said initial contracted condition upon deactivation and axial contraction of said piezoelectric body.

8. A lead screw piezo nut positioning device, comprising:

(a) a coupling member adapted for securement to an external machine part and having a longitudinal bore for receiving a lead screw therethrough such that the lead screw does not directly drivingly engage and cause movement of said coupling member nor of the external machine part which is movable in a direction along a longitudinal rotational axis of the lead screw;

(b) a driven member threadably coupled to and disposed about the lead screw for undergoing coarse movement along the longitudinal rotational axis of the lead screw in response to rotation of the lead screw; and (c) a piezo nut positioner assembly disposed between said coupling and driven members and having a longitudinal passage for receiving the lead screw therethrough such that said assembly is not directly drivingly engaged nor moved by the lead screw, said assembly being electrically activatable to undergo axial expansion along the lead screw, said assembly extending between and interconnecting said coupling and driven members such that the position of the external machine part secured to said coupling member can be coarsely adjusted relative to the lead screw via said assembly and coupling member undergoing the coarse movement with said driven member along the lead screw, while said assembly is deactivated, in response to rotation of the lead screw and can be finely adjusted relative to the lead screw via said coupling member undergoing fine movement corresponding to the axial expansion of said assembly along the lead screw when the rotation of the lead screw and thus the coarse movement of said driven member have ceased.

9. The device of claim 8 wherein said axial expansion of said piezo nut positioner assembly is proportional to a frequency of an electrical voltage applied to said assembly.

10. The device of claim 8 wherein said piezo nut positioner assembly includes a tubular casing having a pair of opposite end portions, said coupling member being mounted to one of said opposite end portions of said casing and said driven member being mounted to the other of said opposite end portions of said casing such that said casing interconnects said coupling and driven members together and the position of the external machine part secured to said coupling member is finely adjustable relative to the lead screw by said axial expansion of said assembly along the lead screw without corresponding rotation of the lead screw.

11. The device of claim 10 wherein said coupling member has internal threads and said one opposite end portion of said casing has external threads for threadably mating with said internal threads of said coupling member.

12. The device of claim 11 wherein said driven member has external threads and said other opposite end portion of said casing has internal threads for threadably mating with said external threads of said driven member.

13. The device of claim 10 wherein said tubular casing has an initial contracted condition from which said casing axially elongates upon activation and axial expansion of said piezo nut positioner assembly, said casing also having a plurality of spaced apart substantially circumferential slots formed therein providing said casing with a spring back bias causes said casing to return to said initial contracted condition upon deactivation and axial contraction of said piezo nut positioner assembly.

14. The device of claim 8 wherein said piezo nut positioner assembly includes a piezoelectric body formed of a plurality of piezo ceramic disks and a plurality of metallic electrodes, said piezo ceramic disks being mounted to one another and together defining said longitudinal passage for receiving the lead screw therethrough such that said piezo ceramic disks are not directly drivingly engaged with the lead screw.

15. The device of claim 14 wherein said metallic electrodes are each disposed between and mounted to adjacent ones of said piezo ceramic disks such that said metallic electrodes and said piezo ceramic disks are disposed in an alternating arrangement.

16. The device of claim 14 wherein said metallic electrodes are mounted to said piezo ceramic disks in a predetermined arrangement and said piezo ceramic disks are axially expandable parallel to the longitudinal axis of the lead screw in proportion to the frequency of an electrical voltage applied to said metallic electrodes.

17. The device of claim 16 wherein said piezo ceramic disks are mounted to one another in a stacked configuration.

18. The device of claim 8 further comprising:

a coil spring mounted to and disposed circumferentially about said driven member for preloading said driven member.

19. The device of claim 8 further comprising:

a cover mounted to said piezo nut positioner assembly and disposed substantially around said driven member.

20. A lead screw piezo nut positioning device, comprising:

(a) an elongated lead screw having external drive threads extending substantially between opposite end portions thereof, said lead screw being adapted at one end for coupling to a source of rotary motion for rotatably driving said lead screw about a longitudinal rotational axis;

(b) a coupling member adapted for securement to an external machine part and having a threadless longitudinal bore for receiving said lead screw therethrough such that said external drive threads of said lead screw do not directly drivingly engage and cause movement of said coupling member nor of the external machine part which is movable in a direction along said longitudinal rotational axis of said lead screw;

(c) a driven member disposed about and threadably coupled with said external drive threads of said lead screw for undergoing coarse movement along said longitudinal rotational axis of said lead screw in response to rotation of said lead screw; and (d) a piezo nut positioner assembly disposed between said coupling and driven members and having a threadless longitudinal passage for receiving said lead screw therethrough such that said assembly is not directly drivingly engaged nor moved by said external drive threads of said lead screw, said assembly being electrically activatable to undergo axial expansion along said lead screw, said assembly extending between and interconnecting said coupling and driven members such that the position of the external machine part secured to said coupling member can be coarsely adjusted relative to said lead screw via said assembly and coupling member undergoing the coarse movement with said driven member along the lead screw, while said assembly is deactivated, in response to rotation of said lead screw and can be finely adjusted relative to said lead screw via said coupling member undergoing fine movement corresponding to the axial expansion of said assembly along said lead screw when the rotation of said lead screw and thus the coarse movement of said driven member have ceased.

* * * * *